United States Patent
Azuma et al.

(10) Patent No.: US 10,476,241 B2
(45) Date of Patent: Nov. 12, 2019

(54) DIN RAIL INSTALLING PORTION STRUCTURE OF ELECTRICAL APPLIANCE AND SOCKET

(71) Applicant: OMRON Corporation, Kyoto (JP)

(72) Inventors: Yoshihiro Azuma, Yamaga (JP); Kiyokazu Matsunaga, Kumamoto (JP); Hiroshi Hashimoto, Kumamoto (JP); Keisuke Yano, Kikuchi (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/132,495

(22) Filed: Sep. 17, 2018

(65) Prior Publication Data
US 2019/0123520 A1 Apr. 25, 2019

(30) Foreign Application Priority Data
Oct. 23, 2017 (JP) .................... 2017-204718

(51) Int. Cl.
*H02B 1/052* (2006.01)
*H01R 13/20* (2006.01)
*H01R 9/26* (2006.01)

(52) U.S. Cl.
CPC ......... *H02B 1/0523* (2013.01); *H01R 9/2608* (2013.01); *H01R 13/20* (2013.01)

(58) Field of Classification Search
CPC ...... H01R 9/26; H01R 9/2608; H01R 13/518; H01R 13/20; H02B 1/0523
USPC ................................. 439/716, 532
See application file for complete search history.

(56) References Cited

U.S. PATENT DOCUMENTS

| | | | | |
|---|---|---|---|---|
| 3,430,190 A | * | 2/1969 | Verneau | F16B 21/088 439/716 |
| 4,111,517 A | * | 9/1978 | Debaigt | H01R 9/2608 439/716 |
| 6,293,820 B1 | * | 9/2001 | Bechaz | H02B 1/052 439/532 |
| 6,840,819 B2 | * | 1/2005 | Bet | H02B 1/052 439/157 |
| 7,374,454 B1 | * | 5/2008 | Wang | H01R 13/518 439/373 |

(Continued)

FOREIGN PATENT DOCUMENTS

| | | |
|---|---|---|
| CH | 581395 | 10/1976 |
| DE | 2752259 | 5/1979 |

(Continued)

OTHER PUBLICATIONS

"Search Report of Europe Counterpart Application", dated Feb. 25, 2019, p. 1-p. 8.

*Primary Examiner* — Gary F Paumen
(74) *Attorney, Agent, or Firm* — JCIPRNET (57) ABSTRACT

A DIN rail installing portion structure of an electrical appliance and a socket are provided. A back cover of a socket includes: a fitting groove, which is fitted to a DIN rail; and a claw portion, which is formed on a first side surface portion of both side surface portions of the fitting groove. A first edge portion of the DIN rail is clamped by the claw portion to hold the socket 1 on the DIN rail. The claw portion elastically presses a first edge portion of the DIN rail in a thickness direction. On the first edge portion side of the DIN rail, there is no claw of which a width of clamping the first edge portion in the thickness direction does not change.

7 Claims, 4 Drawing Sheets

(56) References Cited

U.S. PATENT DOCUMENTS

| | | | | |
|---|---|---|---|---|
| 7,704,102 B2* | 4/2010 | Nad | ........................ | H01R 9/26 |
| | | | | 439/221 |
| 8,062,061 B2* | 11/2011 | Lim | ....................... | H02B 1/052 |
| | | | | 439/532 |
| 9,331,404 B2* | 5/2016 | Devanand | ............ | H01R 9/2608 |
| 2008/0299820 A1* | 12/2008 | Schelonka | ........... | H01R 9/2608 |
| | | | | 439/532 |
| 2009/0286422 A1* | 11/2009 | Henkel | ................. | H02B 1/052 |
| | | | | 439/532 |
| 2013/0337680 A1* | 12/2013 | Schlegel | .............. | H01R 13/518 |
| | | | | 439/532 |
| 2019/0123520 A1* | 4/2019 | Azuma | ................ | H02B 1/0523 |

FOREIGN PATENT DOCUMENTS

| | | |
|---|---|---|
| DE | 202008017151 | 4/2009 |
| JP | S6286800 | 4/1987 |
| JP | H06223927 | 8/1994 |
| JP | 2006068852 | 3/2006 |

* cited by examiner

DIN RAIL INSTALLING PORTION STRUCTURE OF ELECTRICAL APPLIANCE AND SOCKET

CROSS-REFERENCE TO RELATED APPLICATION

This application claims the priority of Japan patent application serial no. 2017-204718, filed on Oct. 23, 2017. The entirety of the above-mentioned patent application is hereby incorporated by reference herein and made a part of this specification.

BACKGROUND

Technical Field

The disclosure relates to a DIN (Deutsche Industrie Normen) rail installing portion structure for installing an electrical appliance, and a socket which includes the DIN rail installing portion structure.

Related Art

For example, in patent literature 1, a DIN rail installing structure for installing an electrical machine to a DIN rail is disclosed, and the DIN rail installing structure includes a fitting groove, which is fitted with the DIN rail, and is provided with an elastic claw portion as well as a fixed claw portion on one of both side surface portions of the fitting groove. Besides, a DIN rail installing structure of an electrical machine is provided which avoids a stress cracking of the fixed claw portion and improves an installing strength by the elastic claw portion.

[Patent literature 1] Japanese Laid-open Publication No. 2006-68852 (disclosed on Mar. 16, 2006).

Meanwhile, there are two kinds of DIN rails, namely a thick DIN rail and a thin DIN rail, according to thicknesses of edge portions protruding on both sides of an DIN rail. Therefore, in a DIN rail installing structure of an electrical appliance, which has a fixed claw portion corresponding to a thin DIN rail, there is a problem that the fixed claw portion of the electrical appliance cannot be inserted in the thick DIN rail, and if being forcefully inserted, the fixed claw portion will be damaged.

SUMMARY

A DIN rail installing portion structure of an electrical appliance in one aspect of the disclosure includes: a fitting groove, which is fitted to a DIN rail; and at least one claw portion, which is formed on one of both side surface portions of the fitting groove; and the DIN rail installing portion structure of an electrical appliance clamps one side of edge portions protruding on both sides of the DIN rail by the claw portion to hold the electrical appliance on the DIN rail, wherein the claw portion elastically presses the one side of the edge portions protruding on both sides of the DIN rail in a thickness direction, and there is no claw of which a width of clamping the edge portions in the thickness direction does not change on the one side of the edge portions protruding on both sides of the DIN rail.

DESCRIPTION OF THE EMBODIMENTS

One aspect of the disclosure is made in view of the above-described conventional problems, and an aim of the aspect is to provide a DIN rail installing portion structure of an electrical appliance and a socket, wherein the DIN rail installing portion structure can be appropriately installed to DIN rails when the DIN rails with different thicknesses are installed.

According to the above-described configuration, the DIN rail installing portion structure of an electrical appliance includes: the fitting groove, which is fitted to the DIN rail; and the claw portion, which is formed on one of both side surface portions of the fitting groove; and clamps one side of the edge portions protruding on both sides of the DIN rail by the claw portion to hold the electrical appliance on the DIN rail.

Therefore, the claw portion is the only member which clamps one side of the edge portions protruding on the both sides of DIN rail. Besides, the claw portion elastically presses one side of the edge portions protruding on both sides of the DIN rail in a thickness direction. As a result, even when the electrical appliance is installed to a thick DIN rail, one side of the edge portions protruding on both sides of DIN rail is elastically pressed and clamped by an elastic force of the claw portion, so that the claw portion is raised. As a result, the claw portion is not damaged.

Therefore, the DIN rail installing portion structure of an electrical appliance, which can be appropriately installed to DIN rails when the DIN rails with different thickness are installed, can be provided.

In the DIN rail installing portion structure of an electrical appliance in one aspect of the disclosure, a width of the claw portion of clamping the edge portions in a thickness direction can be elastically changed corresponding to a thickness of the edge portions.

Thereby, even when the DIN rail of which the thicknesses of the edge portions are thick is installed, the edge portions of the DIN rail can be elastically clamped because the width of clamping the edge portions in the thickness direction elastically increases. Therefore, when the DIN rail of which the thicknesses of the edge portions are thick is installed, the claw portion for installing the DIN rail is not damaged.

In the DIN rail installing portion structure of an electrical appliance in one aspect of the disclosure, the claw portion can include: an erected wall, which configures a side surface of the fitting groove and is erected from an extension surface of a bottom surface of the fitting groove; and a pressing portion, which is provided extending to an inner side of the fitting groove from the erected wall like a cantilever.

Thereby, the claw portion includes: the erected wall, which configures the side surface of the fitting groove and is erected from the extension surface of the bottom surface of the fitting groove; and the pressing portion, which is provided extending to the inner side of the fitting groove from the erected wall like a cantilever. Therefore, when the DIN rail of which the thicknesses of the edge portions are thick is installed, a rotation centre of the claw portion, which is elastically rotated and deformed, becomes a root of the erected wall of the claw portion. As a result, a rotation radius of the claw portion becomes greater, so that the claw portion is easy to be elastically deformed.

In the DIN rail installing portion structure of an electrical appliance in one aspect of the disclosure, the claw portion has a notch groove, which is parallel to a direction orthogonal to the DIN rail on the fitting groove on the outer side extension surface of the bottom surface of the fitting groove in the erected wall.

Thereby, the rotation centre of the claw portion, which is elastically rotated and deformed, is an outer side end portion of the notch groove of the claw portion. As a result, the rotation radius of the claw portion further increases, so that the claw portion is even easier to be elastically deformed.

In the DIN rail installing portion structure of an electrical appliance in one aspect of the disclosure, the pressing portion of the claw portion desirably has an inclined surface, which gets close to the bottom surface of the fitting groove as a pressing surface to the edge portions moves from a free end to a fixed end.

Thereby, when the DIN rail is fitted to a fitting portion, the pressing surface is inclined, so that the edge portions of the DIN rail can be easily fitted to the fitting groove by the edge portions being tilted to be inserted toward the claw portion.

In the DIN rail installing portion structure of an electrical appliance in one aspect of the disclosure, a raising protrusion is desirably formed on the bottom surface which is on one of both side surface portions of the fitting groove where the claw portion is formed to raise the one side of the edge portions protruding on both sides of the DIN rail.

Thereby, the claw portion side of the DIN rail becomes higher due to the raising protrusion, so that a pressing force to the edge portions of the claw portion can be increased.

In the DIN rail installing portion structure of an electrical appliance in one aspect of the disclosure, the at least one claw portion is a plurality of claw portions and can be provided on one of both side surface portions of the fitting groove.

Thereby, one side of the edge portions protruding on both sides of the DIN rail is clamped in multiple places along the DIN rail, so that a clamping force is increased. As a result, the electrical appliance can be stably held.

The socket in one aspect of the disclosure is characterized in including the DIN rail installing portion structure of an electrical appliance.

According to the above-described configuration, a socket can be provided which includes the DIN rail installing portion structure of an electrical appliance which can avoid the claw portion for installing the DIN rail from being damaged when a thick DIN rail is installed.

According to one aspect of the disclosure, the following effect is achieved, that is, the DIN rail installing portion structure of an electrical appliance and the socket are provided, wherein the DIN rail installing portion structure of an electrical appliance can be appropriately installed to the DIN rails when the DIN rails with different thicknesses are installed.

Next, embodiments of one aspect of the disclosure (also referred to as "the embodiment" hereinafter) are described based on drawings.

Application Example

Figure 1:
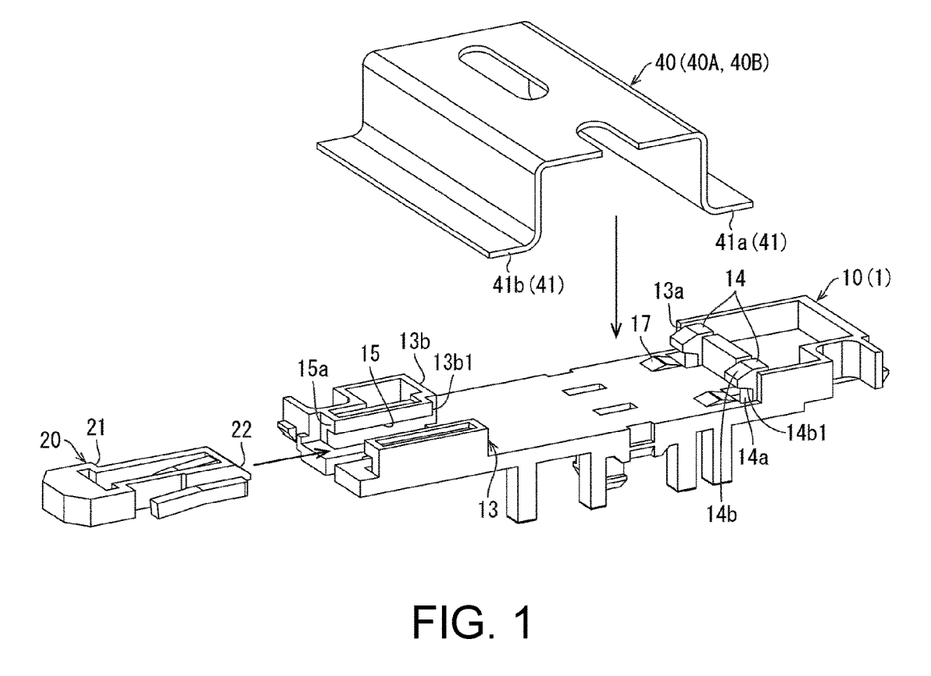
FIG. 1 is an exploded perspective view which illustrates a DIN rail installing portion structure of an electrical appliance in embodiment 1 of the disclosure.

At first, one example of a scene, in which the disclosure is applied, is described based on FIG. 1. FIG. 1 is an exploded perspective view which illustrates a DIN rail installing portion structure in one aspect of the disclosure.

As shown in FIG. 1, the DIN rail installing portion structure of a back cover 10 of a socket 1 in the embodiment of the disclosure includes: a fitting groove 13, which is fitted to a DIN rail 40; and a claw portion 14 which is formed on a first side surface portion 13a of both side surface portions of the fitting groove 13; and clamps a first edge portion 41a of edge portions 41 protruding on both sides of the DIN rail 40 by the claw portion 14 to hold the socket 1 on the DIN rail 40. Besides, the claw portion 14 elastically presses the first edge portion 41a of the edge portions 41 protruding on both sides of the DIN rail 40 in a thickness direction. In addition, on the side of the first edge portion 41a of the edge portions 41 protruding on both sides of the DIN rail 40, there is no claw of which a width of clamping the edge portions 41 in the thickness direction does not change.

Furthermore, the socket 1 functions as an electrical appliance in one aspect of the disclosure. The back cover 10 functions as a DIN rail installing portion in one aspect of the disclosure. The first side surface portion 13a functions as one side surface portion in one aspect of the disclosure. The first edge portion 41a functions as a first edge portion 41a in one aspect of the disclosure.

Thereby, the claw portion 14 is the only member which clamps the first edge portion 41a protruding on both sides of the DIN rail 40. Besides, the claw portion 14 elastically presses the first edge portion 41a of the edge portions 41 protruding on both sides of the DIN rail 40 in the thickness direction. As a result, even when the socket 1 is installed to a thick DIN rail 40B, the first edge portion 41a of the thick DIN rail 40B is elastically pressed and clamped by an elastic force of the claw portion 14, so that the claw portion 14 is raised. As a result, the claw portion 14 is not damaged.

Therefore, a DIN rail installing portion structure of an electrical appliance, which can be appropriately installed to DIN rails when the DIN rails with different thickness are installed, and a socket can be provided.

In addition, in the DIN rail installing portion structure of the back cover 10 of the socket 1 in the embodiment of the disclosure, in the claw portion 14, a width of clamping the edge portions 41 in the thickness direction is elastically changed corresponding to thicknesses of the edge portions 41.

Figure 5A:
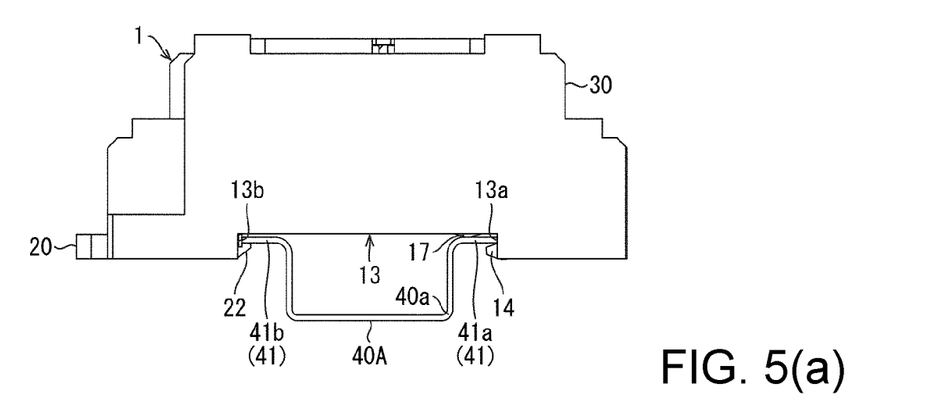
FIG. 5(a) is a front view which illustrates the socket installed to a thin DIN rail, and FIG. 5 (b) is a front view which illustrates the socket installed to a thick DIN rail.
Figure 5B:
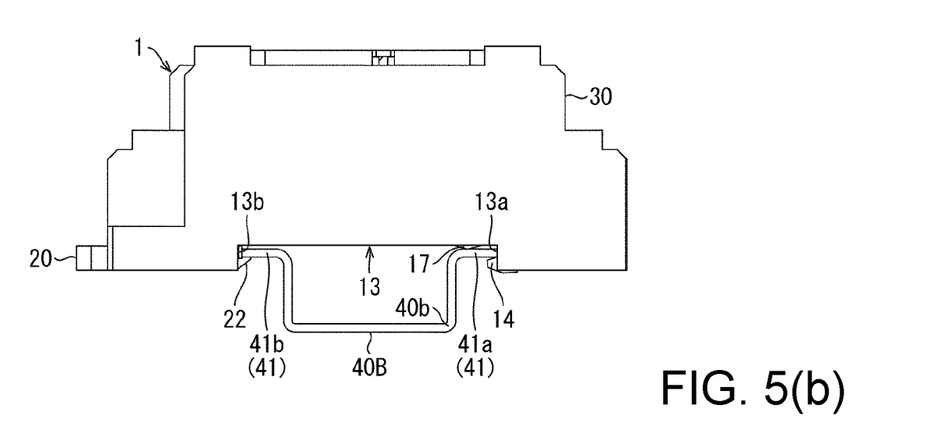

Thereby, as shown in FIG. 5(b), even when the thick DIN rail 40B having thick edge portions 41 is installed, the first edge portion 41a of the thick DIN rail 40B can also be elastically clamped because the width of clamping the first edge portion 41a in the thickness direction elastically increases. Therefore, when the thick DIN rail 40B having a thick first edge portion 41a is installed, the claw portion 14 for installing the thick DIN rail 40B is not damaged.

Configuration Example

Embodiment 1

The embodiment of the disclosure is described based on FIG. 1-FIG. 5 as follows.

Figure 2:
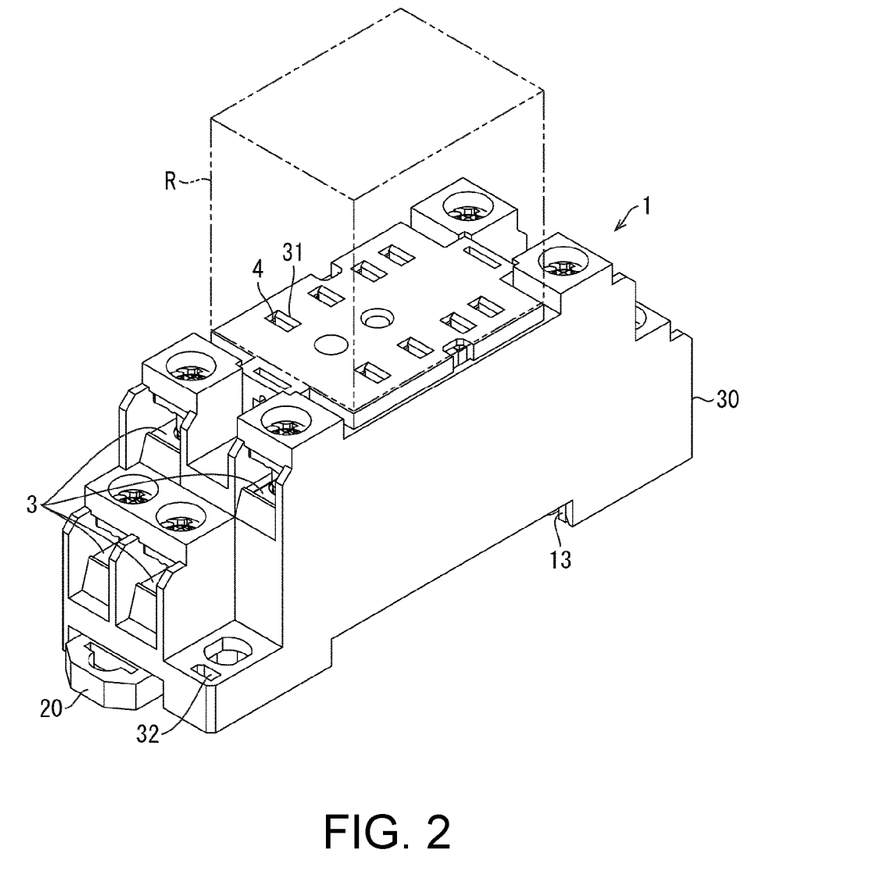
FIG. 2 is a perspective view which illustrates an overall configuration of a socket which serves as the electrical appliance.

An overall configuration of the socket, which serves as the electrical appliance of the embodiment, is described based on FIG. 2. FIG. 2 is a perspective view which illustrates the overall configuration of the socket 1 of the embodiment. Furthermore, in the embodiment, an upper side of the paper surface (a side where a relay R shown by dotted lines is attached) in FIG. 2 is called a front side, and a lower side of the paper surface in FIG. 2 is called a back side or a rear side.

As shown in FIG. 2, the socket 1 of the embodiment is in an almost rectangular parallelepiped shape, and includes eight connection terminals for external wiring 3 in total, four on each of both end portions in a longitudinal direction. In addition, eight connection terminals for electrical machine terminal 4 are provided in the interior, and these connection terminals for electrical machine terminal 4 are exposed from a terminal insertion hole 31 formed in the front surface of a front cover 30 of the socket 1. In this way, the socket 1 of the embodiment is, for example, an eight-socket terminal. Furthermore, in the embodiment, although the socket 1 which serves as the electrical appliance is illustrated and described, the electrical appliance is not limited to the socket 1 in one aspect of the disclosure. For example, the electrical appliance can also be an electrical appliance which is installed directly without using the socket 1, such as a relay, a timer, a counter, a sensor controller, a PLC (Programmable Logic Controller) and so on.

As shown in FIG. 2, in the embodiment, in the front surface of the socket 1, for example, a relay R which serves as the electrical machine is installed. When the relay R is installed to the socket 1, a connection terminal not shown in the drawing, which serves as an electrical machine terminal of the relay R, is inserted in the terminal insertion hole 31 of the front cover 30. Thereby, the connection terminal of the relay R is electrically connected to the connection terminal for electrical machine terminal 4. Furthermore, as for the socket 1 of the embodiment, for example the relay R which serves as the electrical machine is installed to the socket 1. However, in one aspect of the disclosure, an amount of the terminals or the like is not necessary limited thereto; for example, any electrical machine such as the timer can also be attached to the socket.

Figure 3:
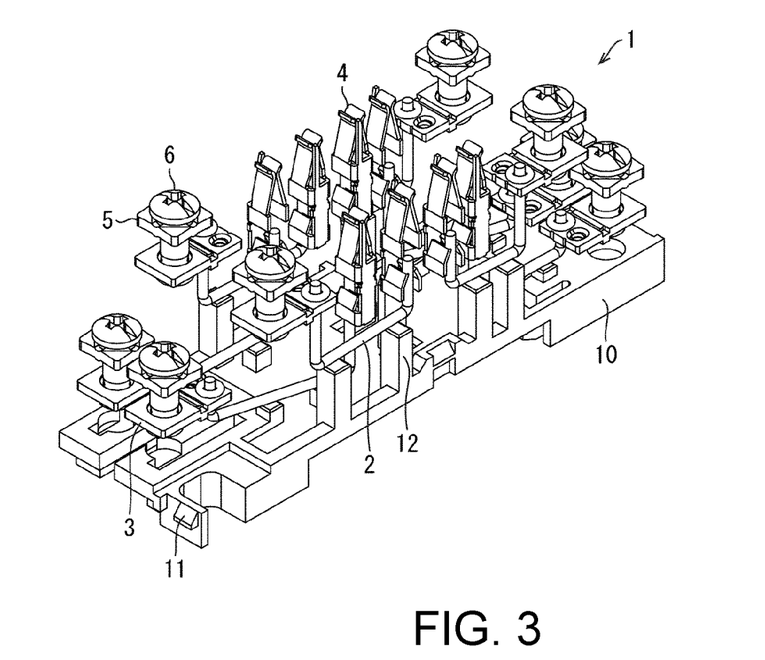
FIG. 3 is a perspective view which illustrates an internal structure of the socket.

An internal configuration of the socket 1 of the embodiment is described based on FIG. 2 and FIG. 3. FIG. 3 is a perspective view which illustrates an internal structure of the socket 1.

As shown in FIG. 2 and FIG. 3, the socket 1 of the embodiment includes the back cover 10 provided on a lower side, and the front cover 30 provided on an upper side. The back cover 10 and the front cover 30 are resin products, and have an insulating property. The back cover 10 and the front cover 30 can be installed integrally by inserting a claw 11 of the back cover 10 into a hole for claw 32 of the front cover 30 shown in FIG. 2.

In the interior of the socket 1 which is covered by the back cover 10 and the front cover 30, a rod-shaped wire 2, the connection terminal for external wiring 3, the connection terminal for electrical machine terminal 4 and a washer 5 are provided.

The rod-shaped wire 2 is a connection member between terminals which connects the connection terminal for external wiring 3 and the connection terminal for electrical machine terminal 4, and is made from a rod-shaped bare conductor wire in the embodiment. Furthermore, a cross section of the rod can be any one of a circular shape, an elliptical shape, and a polygonal shape.

In the socket 1 of the embodiment, an external wiring not shown in the drawing is connected to the connection terminal for external wiring 3 by a screw 6. Thereby, the connection terminal for external wiring 3 is electrically connected to the connection terminal for electrical machine terminal 4 through the rod-shaped wire 2. Furthermore, on the back cover 10, a back cover protrusion portion 12 is erected in order to prevent the rod-shaped wire 2 from moving downward in the interior of the socket 1.

As a result, as shown in FIG. 2, by inserting, for example, the connection terminal of the relay R into the terminal insertion hole 31 of the front cover 30 from a front side of the socket 1, the relay R is electrically connected to the connection terminal for electrical machine terminal 4, and the relay R can be turned to a usable state.

Meanwhile, the socket 1 of the embodiment is, for example, installed and fixed to the DIN rail in a control panel. Therefore, the socket 1 has the back cover 10, which serves as the DIN rail installing portion, as a configuration for the installing and fixing to the DIN rail.

Figure 4:
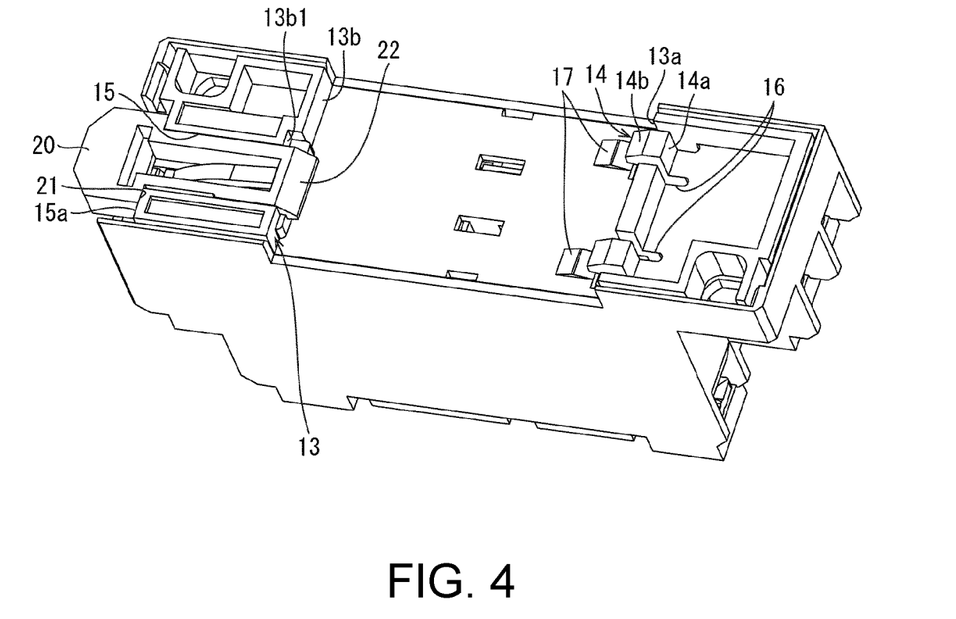
FIG. 4 is a perspective view which illustrates a configuration of a rear part of the socket.

The configuration of the back cover 10, which serves as an installing portion for the installing and fixing to the DIN rail, is described based on FIG. 1, FIG. 4 and FIG. 3. FIG. 1 is an exploded perspective view which illustrates a structure of the back cover 10, which serves as the DIN rail installing portion of the socket 1 in the embodiment. FIG. 4 is a perspective view which illustrates a configuration of a rear part of the socket 1.

First, the DIN rail is described. The DIN (German industrial standard) rail is a metal rail which is commonly used when the electrical machine used in the control panel, such as the relay, the timer, the counter or the like, is installed to the control panel. Compared with an installation by a screw, the DIN rail is easy to attach/detach, and the workload of construction and maintenance can be reduced. Because the DIN rail is made according to the standard, the DIN rail made by any manufacturer is in a uniform size, and the DIN rail of a 35 mm width is usually used in the control panel.

As shown in FIG. 1, the DIN rail 40 has a C-type channel structure, and has the edge portions 41 protruding on both end portions. Therefore, as shown in FIG. 1, the back cover 10 which serves as the DIN rail installing portion of the embodiment includes: the fitting groove 13, which is fitted to the DIN rail 40; and the claw portion 14, which is formed on the first side surface portion 13a which is one of both side surface portions of the fitting groove 13. The fitting groove 13 is an area between the first side surface portion 13a and a second side surface portion 13b. Besides, the first edge portion 41a on one side of the edge portions 41 protruding on both sides of the DIN rail 40 is clamped by the claw portion 14 to hold the socket 1 which serves as the electrical appliance on the DIN rail 40. Furthermore, the claw portion 14 is formed integrally with the back cover 10 made from resin products. Therefore, the back cover 10 and the claw portion 14 are made from elastic bodies.

As shown in FIG. 4, a central portion of the second side surface portion 13b, which is the other one of the two side surface portions of the fitting groove 13, becomes a side surface opening 13b1, and the side surface opening 13b1 is an outlet of a slide guide path 15 where a rail holder 20 slides. As shown in FIG. 1, the slide guide path 15 has a groove structure, and a rail holder 20 is guided along the groove to slide freely.

Here, as shown in FIG. 1 and FIG. 4, the rail holder 20 is provided with an abutting portion 21. Therefore, when the rail holder 20 slides through the slide guide path 15 toward the fitting groove 13, the rail holder 20 is stopped from sliding by the abutment of the abutting portion 21 to an inlet wall 15a of the slide guide path 15.

In addition, as shown in FIG. 4, a rail locking portion 22 of which a cross section is in a peak shape is provided to protrude on a front end of a sliding direction of the rail holder 20. Besides, when the rail holder 20 is stopped from sliding, as shown in FIG. 4, the rail locking portion 22 is in a state of protruding further to the interior of the fitting groove 13 than the second side surface portion 13b.

As a result, as shown in FIG. 5 (*a*), (*b*) described below, on the second side surface portion 13*b* of the fitting groove 13, a second edge portion 41*b* of the DIN rail 40 is clamped between the rail locking portion 22 of the rail holder 20 and a bottom of the fitting groove 13 and locked.

Meanwhile, according to the thicknesses of the edge portions protruding on the both sides of the DIN rail 40, there are two kinds of DIN rail 40, namely a thin DIN rail 40A and a thick DIN rail 40B. Therefore, in the DIN rail installing structure of an electrical appliance, which has a conventional fixed claw portion corresponding to the thin DIN rail 40A, that is, a claw of which a width of clamping the edge portions 41 in the thickness direction is not changed, the thick DIN rail 40B cannot be inserted into the fixed claw portion of the electrical appliance. As a result, if the thick DIN rail 40B is forcefully inserted, there is a problem that the fixed claw portion is damaged, or a substrate which serves as the DIN rail installing portion is deformed. Furthermore, the socket 1 is difficult to be shared between the thin DIN rail 40A and the thick DIN rail 40B.

Therefore, as shown in FIG. 1, in the structure of the back cover 10 which serves as the DIN rail installing portion of the socket 1 in the embodiment, the claw portion 14 elastically presses the first edge portion 41*a*, which is one side of the edge portions 41 protruding on both sides of the DIN rail 40, in the thickness direction. On this occasion, there is no claw, of which the width of clamping the first edge portion 41*a* in the thickness direction does not change, on the first edge portion 41*a* side.

The specific configuration of the claw portion 14 of the back cover 10 in the embodiment, which has the above-described function, is described based on FIG. 1 and FIG. 4.

As shown in FIG. 1 and FIG. 4, the claw portion 14 of the embodiment has an erected wall 14*a* and a pressing portion 14*b*. In the embodiment, the erected wall 14*a* is erected from an extension surface of a bottom surface of the fitting groove 13, and configures a side surface of the fitting groove 13. In addition, the pressing portion 14*b* is provided extending to an inner side of the fitting groove 13 from the erected wall 14*a* like a cantilever.

Thereby, when the thick DIN rail 40B which has thick edge portions 41 is installed, the rotation centre of the claw portion 14 which is elastically rotated and deformed becomes a root of the erected wall 14*a* of the claw portion 14. As a result, a rotation radius of the claw portion 14 becomes greater, so that the claw portion 14 is easy to be elastically deformed.

In addition, as shown in FIG. 4, in the embodiment, the claw portion 14 has a notch groove 16, which is parallel to a direction orthogonal to the DIN rail 40 of the fitting groove 13, on the outer side extension surface of the bottom surface of the fitting groove 13 in the erected wall 14*a*. The notch groove 16 passes through the back cover 10. Thereby, the rotation centre of the claw portion 14, which is elastically rotated and deformed, becomes an outer side end portion of the notch groove 16 of the claw portion 14. As a result, the rotation radius of the claw portion 14 further increases, so that the claw portion 14 is even easier to be elastically deformed.

In addition, as shown in FIG. 1, the pressing portion 14*b* includes an inclined surface 14*b*1, which gets close to the bottom surface of the fitting groove 13 as a pressing surface toward the first edge portion 41*a* of the DIN rail 40 moves from a free end to a fixed end. Thereby, the pressing surface which presses the edge portions 41 of the DIN rail 40 is inclined, so that the edge portions 41 of the DIN rail 40 can be easily fitted to the fitting groove 13 by tiling the edge portions 41 to insert the DIN rail 40 toward the claw portion 14.

In addition, in the embodiment, multiple claw portions 14 can be provided on the first side surface portion 13*a*, which is one of the first side surface portion 13*a* and the second side surface portion 13*b* which are two side surface portions of the fitting groove 13; for example, two claw portions 14 are provided. Thereby, the first edge portion 41*a*, which is one of the edge portions 41 protruding on both sides of the DIN rail 40, is clamped in two places along the DIN rail 40, so that a clamping force is increased. As a result, the socket 1 can be stably held. Furthermore, although two claw portions 14 are provided in the embodiment, in one aspect of the disclosure, an amount of the claw portion 14 is not limited to two. For example, there can be one claw portion 14. On this occasion, a long claw portion 14 is desirably provided along the DIN rail 40. In addition, in the embodiment, there are multiple claw portions 14, for example two; however, in one aspect of the disclosure, there can also be more than three claw portions 14.

In addition, as shown in FIG. 4, in the embodiment, a raising protrusion 17, which raises the first edge portion 41*a* of the edge portions 41 protruding on both sides of the DIN rail 40, is formed on the bottom surface on the first side surface portion 13*a*, which is one of the first side surface portion 13*a* and the second side surface portion 13*b*, which are the two side surface portions of the fitting groove 13, where the claw portion 14 is formed. Thereby, the claw portion 14 side of the DIN rail 40 becomes higher due to the raising protrusion 17, so that the pressing force to the edge portions 41 of the claw portion 14 can be increased.

A method of installing the socket 1, which includes the back cover 10 serving as the DIN rail installing portion of the socket 1 with the above-described configuration, to the DIN rail 40 is described based on FIG. 1 and FIG. 5(*a*), (*b*). FIG. 5(*a*) is a front view which illustrates the socket 1 installed to the thin DIN rail 40A. FIG. 5(*b*) is a front view which illustrates the socket 1 installed to the thick DIN rail 40B.

First, an occasion is described on which the DIN rail 40A is installed to the fitting groove 13 of the back cover 10 of the socket 1. As shown in FIG. 1, when the thin DIN rail 40A is installed to the fitting groove 13, the first edge portion 41*a* of the thin DIN rail 40A is inserted between the bottom of the fitting groove 13 and the inclined surface 14*b*1 on the pressing portion 14*b* of the claw portion 14. On this occasion, there is an inclined surface 14*b*1 on the pressing portion 14*b*, and in the embodiment, an inclination angle of the inclined surface 14*b*1 is almost equal to an insertion direction of the first edge portion 41*a*. Therefore, the first edge portion 41*a* of the thin DIN rail 40A can be easily inserted.

After the first edge portion 41*a* of the thin DIN rail 40A is inserted to the claw portion 14 side as described above, the second edge portion 41*b* of the thin DIN rail 40A is abutted to the bottom of the fitting groove 13. In this state, the rail holder 20 slides to pass through the slide guide path 15. Besides, the rail holder 20 is stopped from sliding by the abutment of the abutting portion 21 of the rail holder 20 to the inlet wall 15*a* of the slide guide path 15.

In this state, the rail locking portion 22 of the rail holder 20 protrudes more than the second side surface portion 13*b*. As a result, as shown in FIG. 5(*a*), the first edge portion 41*a* and second edge portion 41*b* of the thin DIN rail 40A are fitted to the fitting groove 13 of the back cover 10. In this state, the first edge portion 41a of the thin DIN rail 40A is clamped between the bottom of the fitting groove 13 and the claw portion 14.

Next, an occasion is described on which the thick DIN rail 40B is installed to the fitting groove 13 of the back cover 10 of the socket 1. An order in which the thick DIN rail 40B is installed to the fitting groove 13 is the same as the order in which the thin DIN rail 40A is installed to the fitting groove 13 of the back cover 10 of the socket 1. As a result, as shown in FIG. 5 (b), the first edge portion 41a and the second edge portion 41b of the thick DIN rail 40B are fitted to the fitting groove 13 of the back cover 10.

In this state, the first edge portion 41a of the thick DIN rail 40B is clamped in a pressed state between the bottom of the fitting groove 13 and the claw portion 14. As a result, specifically, compared with the case of thin DIN rail 40A, the claw portion 14 is in a state of being slightly inclined due to the pressing force. Thereby, in the embodiment, the socket 1 can be installed to the thick DIN rail 40B without damaging the claw portion 14 even when the thick DIN rail 40B is used.

As a result, the socket 1 can be installed to the thin DIN rail 40A or the thick DIN rail 40B without any strangeness in either the thin DIN rail 40A or the thick DIN rail 40B.

As described above, the structure of the back cover 10, which serves as the DIN rail installing portion of the socket 1 serving as the electrical appliance in the embodiment, includes: the fitting groove 13, which is fitted to the DIN rail 40; and the claw portion 14, which is formed on the first side surface portion 13a, which is one of both side surface portions of the fitting groove 13; and clamps the first edge portion 41a which is one side of the edge portions 41 protruding on both sides of the DIN rail 40 by the claw portion 14 to hold the socket 1 on the DIN rail 40. Besides, the claw portion 14 elastically presses the first edge portion 41a of the edge portions 41 protruding on both sides of the DIN rail 40 in the thickness direction. In addition, on the first edge portion 41a side of the edge portions 41 protruding on both sides of the DIN rail 40, there is no claw of which the width of clamping the edge portions 41 in the thickness direction does not change.

Therefore, the claw portion 14 is the only member which clamps the first edge portion 41a of the edge portions 41 protruding on both sides of the DIN rail 40. The claw portion 14 elastically presses the first edge portion 41a of the DIN rail 40 in the thickness direction. As a result, even when the socket 1 is installed to the thick DIN rail 40B, the first edge portion 41a is elastically pressed and clamped by the elastic force of the claw portion 14. Therefore, the claw portion 14 is raised. Therefore, the claw portion 14 is not damaged.

Therefore, the DIN rail installing portion structure of the electrical appliance and the socket can be provided, wherein the DIN rail installing portion structure of the electrical appliance can be appropriately installed to the thin DIN rail 40A or the thick DIN rail 40B when the thin DIN rail 40A or the thick DIN rail 40B of which the thickness are different from one another is installed. In addition, in this way, a structure of the DIN rail installing portion, which can be shared between the thin DIN rail 40A and the thick DIN rail 40B, can be realized.

In addition, in the DIN rail installing portion structure of the back cover 10 of the socket 1 in the embodiment, in the claw portion 14, the width of clamping the edge portions 41 in the thickness direction is elastically changed corresponding to the thickness of the edge portions 41.

Thereby, as shown in FIG. 5(b), even when the thick DIN rail 40B, which has thick edge portions 41 is installed, the first edge portion 41a of the thick DIN rail 40B can be elastically clamped because the width of clamping the first edge portion 41a in the thickness direction elastically increases. Therefore, the DIN rail installing portion structure of the electrical appliance and the socket 1 can be provided, wherein the DIN rail installing portion structure of the electrical appliance can be appropriately installed to the thin DIN rail 40A or the thick DIN rail 40B when the thin DIN rail 40A or the thick DIN rail 40B of which the thicknesses are different from one another is installed.

Furthermore, the disclosure is not limited in the embodiments described above, various changes can be made in the scope defined by the claims, and embodiments obtained by appropriately combining the technical means disclosed respectively in different embodiments are also included in the technical scope of the disclosure. Furthermore, new technical characteristics can be formed by the combination of the technical means disclosed respectively in each embodiment.

What is claimed is:

1. A DIN (Deutsche Industrie Normen) rail installing portion structure of an electrical appliance, comprising: a fitting groove, which is fitted to a DIN rail; and at least one claw portion, which is formed on one of both side surface portions of the fitting groove; and clamping one side of edge portions protruding on both sides of the DIN rail by the claw portion to hold the electrical appliance on the DIN rail, wherein the claw portion elastically presses the one side of the edge portions protruding on both sides of the DIN rail in a thickness direction of the DIN rail, wherein the claw portion clamps the edge portions in the thickness direction, and a width of the claw for clamping the edge portions is elastically changed corresponding to a thickness of the edge portions, and wherein the claw portion comprises:

an erected wall, which configures a side surface of the fitting groove, and is erected from an extension surface of a bottom surface of the fitting groove;

a pressing portion, which is provided extending to an inner side of the fitting groove from the erected wall like a cantilever;

a notch groove, which is orthogonal to the DIN rail on the fitting groove on an outer side extension surface of the bottom surface of the fitting groove on the erected wall, and wherein a portion of the other of both side surface portions of the fitting groove is an opening treated as an outlet of a slide guide path; and the DIN rail installing portion structure of an electrical appliance further comprises a rail holder having a rail locking portion, and the rail holder is slidably guided into the slide guide path.

2. The DIN rail installing portion structure of an electrical appliance according to claim 1, wherein the pressing portion of the claw portion comprises a free end and a fixed end connecting to the erected wall, wherein an inclined surface extends from the free end to the fixed end, and the inclined surface gets close to the bottom surface of the fitting groove as the inclined surface gets close to the a fixed end.

3. The DIN rail installing portion structure of an electrical appliance according to claim 2, wherein a raising protrusion is formed on the bottom surface on one of both side surface portions of the fitting groove where the claw portion is formed to raise the one side of the edge portions protruding on both sides of the DIN rail.

4. The DIN rail installing portion structure of an electrical appliance according to claim 1, wherein the at least one claw portion is a plurality of claw portions and is provided on one of both side surface portions of the fitting groove.

5. The DIN rail installing portion structure of an electrical appliance according to claim 2, wherein the at least one claw portion is a plurality of claw portions and is provided on one of both side surface portions of the fitting groove.

6. The DIN rail installing portion structure of an electrical appliance according to claim 3, wherein the at least one claw portion is a plurality of claw portions and is provided on one of both side surface portions of the fitting groove.

7. A socket comprising the DIN rail installing portion structure of an electrical appliance according to claim 1.

* * * * *